(12) United States Patent
Zeng et al.

(10) Patent No.: US 11,580,330 B2
(45) Date of Patent: Feb. 14, 2023

(54) MACHINE LEARNING FRAMEWORK WITH MODEL PERFORMANCE TRACKING AND MAINTENANCE

(71) Applicant: Microsoft Technology Licensing, LLC, Redmond, WA (US)

(72) Inventors: Wenrong Zeng, San Jose, CA (US); Jiaxing Huang, Sunnyvale, CA (US); Juan Wang, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 457 days.

(21) Appl. No.: 16/236,339

(22) Filed: Dec. 28, 2018

(65) Prior Publication Data

US 2020/0210771 A1    Jul. 2, 2020

(51) Int. Cl.
  *G06K 9/62* (2022.01)
  *G06Q 10/063* (2023.01)
  *G06F 16/31* (2019.01)
  *G06N 20/00* (2019.01)

(52) U.S. Cl.
  CPC ......... *G06K 9/6257* (2013.01); *G06F 16/313* (2019.01); *G06N 20/00* (2019.01); *G06Q 10/063* (2013.01)

(58) Field of Classification Search
  CPC .. G06F 16/313; G06K 9/6257; G06K 9/6262; G06N 20/00; G06N 20/10; G06N 20/20; G06N 5/003; G06N 7/005; G06Q 10/063
  USPC ....................................................... 707/661
  See application file for complete search history.

(56) References Cited

U.S. PATENT DOCUMENTS

| | | | | |
|---|---|---|---|---|
| 2004/0162742 A1* | 8/2004 | Stoker | .................... | G06Q 10/06 707/758 |
| 2011/0173093 A1* | 7/2011 | Psota | ..................... | G06Q 30/06 705/26.35 |
| 2012/0191630 A1* | 7/2012 | Breckenridge | ........ | G06N 20/00 706/12 |
| 2013/0024924 A1* | 1/2013 | Brady | .................... | G06Q 50/28 709/206 |
| 2014/0066044 A1* | 3/2014 | Ramnani | ................. | H04W 8/24 455/418 |
| 2014/0081715 A1* | 3/2014 | Govindaraman | .. | G06Q 50/2057 705/7.42 |
| 2014/0236663 A1* | 8/2014 | Smith | ................ | G06Q 10/0633 705/7.27 |

(Continued)

*Primary Examiner* — Syling Yen
(74) *Attorney, Agent, or Firm* — NDWE, LLP

(57) ABSTRACT

Techniques for building a machine learning framework with tracking, model building and maintenance, and feedback loop are provided. In one technique, a prediction model is generated based on features of multiple entities. For each entity indicated in a first database, multiple feature values are identified, which include feature values stored in the first database and feature values based on sub-entity data regarding individuals associated with the entity. The feature values are input into the prediction model to generate a score for the entity. Based on the score, a determination is made whether to add, to a second database, a record for that entity. The second database is analyzed to identify other entities. For each such entity, a determination is made whether to generate a training instance; if so, a training instance is generated and added to training data, which is used to generate another prediction model.

20 Claims, 3 Drawing Sheets

(56) References Cited

U.S. PATENT DOCUMENTS

| | | | |
|---|---|---|---|
| 2015/0317366 A1* | 11/2015 | Gune | G06Q 50/01 |
| | | | 707/722 |
| 2018/0040064 A1* | 2/2018 | Grigg | G06N 5/022 |
| 2018/0101771 A1* | 4/2018 | Schwarm | G06Q 10/10 |
| 2019/0065470 A1* | 2/2019 | Matthews | G06F 40/284 |
| 2019/0095801 A1* | 3/2019 | Saillet | G06N 20/00 |
| 2019/0147076 A1* | 5/2019 | Yang | G06F 16/2228 |
| | | | 707/741 |
| 2020/0057857 A1* | 2/2020 | Roytman | G06N 20/00 |
| 2021/0103937 A1* | 4/2021 | Joglekar | G06K 9/6215 |

* cited by examiner

US 11,580,330 B2

MACHINE LEARNING FRAMEWORK WITH MODEL PERFORMANCE TRACKING AND MAINTENANCE

TECHNICAL FIELD

The present disclosure relates to machine learning and, more particularly to, tracking model performance and continuously maintaining the model with a feedback loop.

BACKGROUND

Acquiring new accounts is a goal of many enterprises, large and small. In one approach, executing such acquisition in an orderly manner involves expanding high quality accounts in a customer relationship management (CRM) database. Such execution comes in two parts: (1) identifying high scalable throughput to find new accounts and send to a CRM database and (2) an executive team analyzing the new accounts to identify high quality ones.

One approach is leveraging entity data to expand the scope of accounts to consider. However, when identifying accounts for sending to the CRM database, the approach utilizes a prescriptive methodology by explicitly laying out static qualification rules. This approach suffers from multiple disadvantages. First, the qualification rules are static and can only change with manual tuning. Second, there is no quantitative evaluation of effectiveness of the existing methodology. There is no benchmark on the accuracy of the qualification rules.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for implementing a machine learning framework to identify high quality entities and track downstream entity conversion are provided. In one approach, a machine-learned prediction model is trained based on entity data and sub-entity data for the features. Labels for the training data are extracted from a database system that tracks the statuses of already identified entities. The prediction model is evaluated based on accuracy and effectiveness and may be automatically retrained.

Embodiments described herein exhibit numerous benefits, such as the machine learning framework being easily applied to multiple units of an enterprise, the dynamic nature of the prediction model, the flexibility to adapt to real-world changes, the ability to expand to a standalone system to assist multiple third-party providers identify high quality entities for their respective enterprise units, and the ability to evaluate the effectiveness of the prediction model.

One problem with conventional approaches to scoring entities is that they fail to capture nonlinear correlations. Embodiments described herein capture nonlinear correlations. Another problem with conventional approaches is that the hand-selection of weights or coefficients in a hand-tuned model is error-prone, time consuming, and non-probabilistic. Hand-selection also allows for bias from potentially mistaken logic. Embodiments described herein are neither error-prone, time consuming, nor non-probabilistic. A third disadvantage is that traditional approaches are unbounded positive or negative values. They do not intuitively map to the probability of a particular action being performed. Embodiments described herein are probabilistic and therefore can give intuitive probability scores.

System Overview

Figure 1:
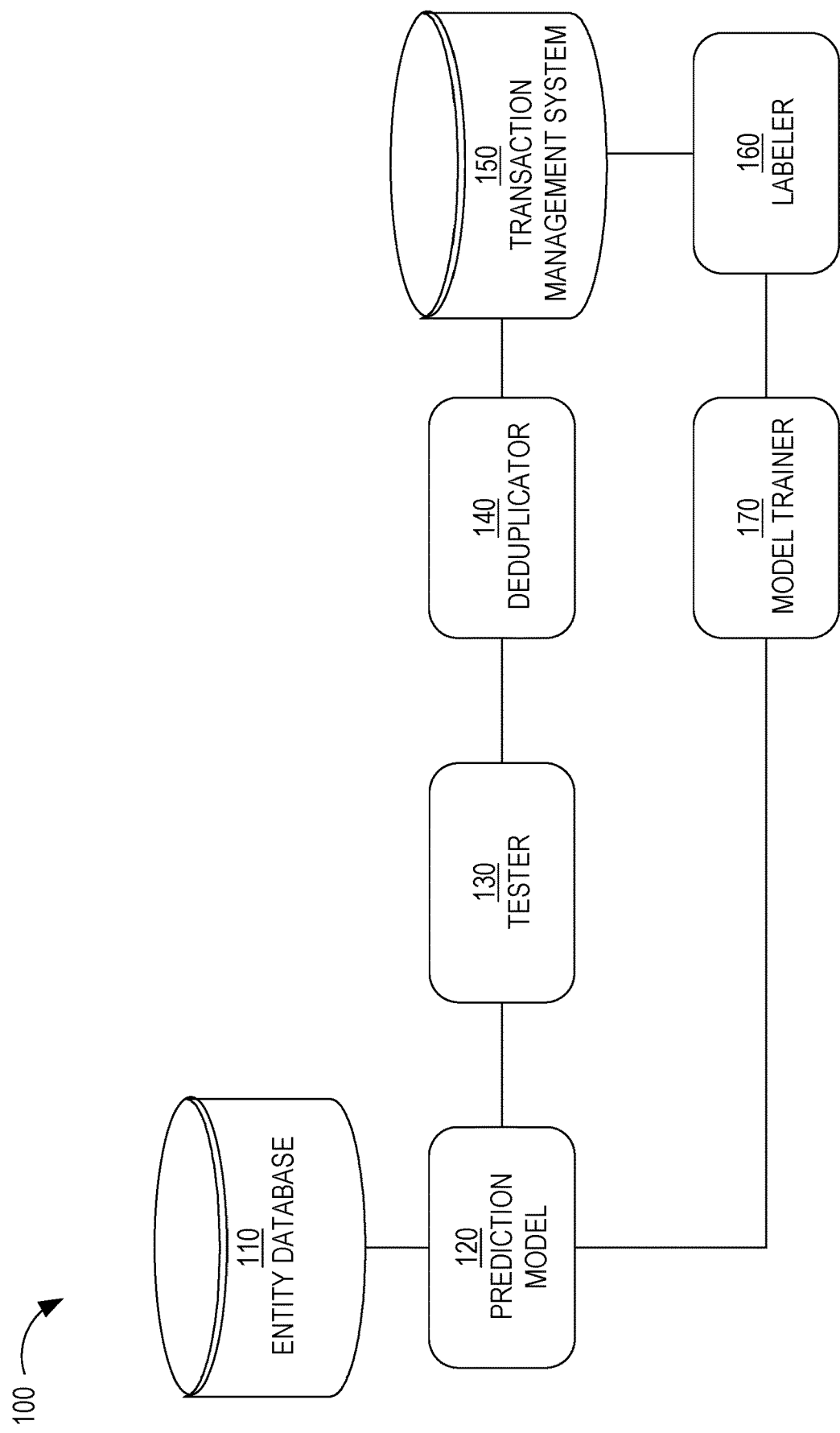
FIG. 1 is a block diagram that depicts an example machine-learning (ML) system for identifying high quality entities, in an embodiment.

FIG. 1 is a block diagram that depicts an example machine-learning (ML) system 100 for identifying high quality entities, in an embodiment. ML system 100 comprises an entity database 110, a prediction model 120, a tester 130, a de-duplicator 140, a transaction management system 150, a labeler 160, and a model trainer 170. Tester 130, de-duplicator 140, labeler 160, and model trainer 170 are implemented in software, hardware, or any combination of software and hardware.

Entity database 110 comprises data about multiple entities. An organization is an example entity. Examples of an organization include a company, a non-profit organization, a charitable organization, a school, a college, a university, a civic organization, and a government organization. Types of data about an entity include size (e.g., number of employees), a textual description, an industry, a country in which the entity is headquartered, a region in which the entity is headquartered, how long the entity has been around or organized, stock price (if applicable), a textual description of the entity, images of the entity (e.g., images of buildings and/or of people that are part of, or affiliated with, the entity), number of people/users who "follow" the entity online (e.g., via an online social network), number of people who have visited a web page (e.g., a "company page") that is dedicated to the entity (but may be hosted by another party, such as an online social network provider), number of news hires to the entity (e.g., in the last year), number of recruiters, number of talent professionals, number of marketers, number of sales professionals, number of employees with a particular degree (e.g., PhD, Masters, and/or Bachelors), etc.

Some of the data about an entity may be input by a representative of the entity. For example, an entity representative may provide a description of the entity, such as a mission of the entity, a vision of the entity, goals of the entity, what the entity produces, what the entity advocates, etc.

Some of the data about an entity may be generated based on analysis of data from one or more other sources (referred to herein as "sub-entity data"). For example, a user database (not depicted) includes data about individual users, such as profile data that the users provide to an online system that makes the profile data available to other users who are considered "friends," "contacts" or "connections" of the users. Each user record or entry may specify a job title, a job function, an industry, one or more current or past employers, a date when the user joined and/or left each employer. Thus, all user records that list a particular entity as a current employer may be analyzed to determine values for some of the types of entity data listed previously.

Prediction model 120 is a machine-learned model that is trained based on training data that comprises multiple training instances, each of which comprises multiple feature values and one or more label values. A label may be binary (e.g., '1' for conversion and '0' for no conversion). Alternatively, a label may be one of multiple possible values, such as one value for representing a closed won opportunity, another value for representing a closed lost opportunity, and another value for representing no opportunity. Specifics about prediction model 120 are described in more detail in the following sections.

Data about a particular entity is input to prediction model 120, which generates a score. Tester 130 determines whether the score is above a particular threshold. If not, then data about another entity from entity database 110 is retrieved. If the score is above the particular threshold, then de-duplicator 140 analyzes the data (or a portion thereof) about the particular entity to determine whether a record for the particular entity already exists in transaction management system 150. If so, then particular entity is ignored. Otherwise, a new record is created in transaction management system 150 and data about the particular entity is stored therein.

An example of transaction management system (TMS) 150 is a customer relationship management (CRM) database. TMS 150 and the associated software may be developed in-house; that is, by the organization that owns or accesses TMS 150. Alternatively, TMS database 150 and its associated software may be provided by a third party, such as Microsoft Dynamics, Salesforce, SugarCRM, NetSuite, Insightly, and Zoho.

In an embodiment, TMS 150 is maintained by the same organization or party that maintains entity database 110. For example, a social network provider owns entity database 110 and allows entity representatives to update the appropriate records in entity database 110. The social network provider also owns TMS 150 and has a separate team of (e.g., sales) professionals accessing and updating data in TMS 150. Thus, a different sets of viewers are allowed to access data from the respective databases. For example, entity database 110 may be publicly accessible (or at least a portion of the entity data is publicly accessible while only a limited set of individuals and/or system processes may update that portion) while TMS 150 is private and only a select group of people within the social network provider are allowed to view and update records in TMS 150.

Labeler 160 analyzes TMS 150 to identify one or more entities that are associated with a certain status, such as closed won, closed lost, or no opportunity. If an entity is associated with a certain status, then labeler 160 creates a training instance that includes feature values of the entity and a label indicating the resolution. Labeler 160 may create a training instance only for entities that are associated with a resolution that occurred within a certain time period, such as the last year or the last three months.

Model trainer 170 trains a new prediction model based on the training instances that labeler 160 produces. Some of the training instance may be the same as the training instances that were used to train prediction model 120. Additionally or alternatively, though a training instance that is used to train a new prediction model may be about a particular entity of which a previous training instance was used to train prediction model 120, the feature values in the training instance may be different than the feature values in the previous training instance. For example, the particular entity may have changed headquarters, may have a different number of employees with a particular job title, or may have a different number of employees with a particular degree.

Deduplication

As noted previously, de-duplicator 140 determines whether a record for a particular entity (that has a score above the particular threshold) already exists in TMS 150. A record might already exist in TMS 150 if ML system 100 previously identified the particular entity and caused the record to be created. Additionally, a record might already exist if a user of TMS 150 caused such a record to be created independently of ML system 100. For example, a sales representative identified a particular entity as an entity that might be interested in acquiring a service or product offered by the sales representative's organization. In response, the sales representative interacted with TMS 150 directly to create a record for the particular entity and provide one or more details about the particular entity to be stored in that record.

One or more features related to whether a record in entity database 110 matches a record in TMS 150 are considered. Example features used to determine a match include whether the names of the respective entities match, an edit distance between the names, whether the respective URLs of the respective entities match, an edit distance between the URLs, whether the domains of the respective email addresses of the entities match, and whether a country or other geographic location indicated in the respective records match. Thus, an exact match of features is not required in order to determine that a match occurs. For example, a value for the country field in one of the records may be empty, a name in one of the records may be misspelled, and an account may be associated with multiple URLs or domains that do not exactly match.

In an embodiment, a similarity score is generated based on multiple features. If the similarity score is above a particular threshold, then the two records are considered a match and a record in TMS 150 is not created for the record in entity database 110. Conversely, if the similarity score is below the particular threshold, then the two records are not considered a match and a record in TMS 150 is created for the record in entity database 110.

In a related embodiment, a machine-learned classification model is trained based on labeled data that comprises multiple training instances, each comprising (1) a set of feature values for multiple features pertaining to a pair of records and (2) a label indicating whether the pair of records is a match. A label may be established manually or automatically. Some labels may be determined manually while other labels may be determined automatically. For example, a random pair of records in the respective databases are automatically retrieved and each field in one record is checked against a corresponding field in the other record to ensure that there is no matching value. Such a pair of records is used as a negative training instance. Example machine learning techniques that may be used to train the model include linear regression, logistic regression, random forests, naive Bayes, XGBoost, and Support Vector Machines (SVMs).

Tracking Enhancement

As noted previously, one approach to identifying entities for adding to a TMS involves applying a set of static rules to entity data stored in an entity database. However, in that approach, there is no visibility in how well those rules perform.

In an embodiment, records in TMS 150 include a value indicating whether the record was created as a result of prediction model 120 and tester 130. If the value indicates not, then it is presumed that a user (e.g., a sales representative) created the record in TMS 150. Thus, each record may include a pre-defined field (a "creation indicator") for indicating automatic record creation or manual record creation. In this way, records in TMS 150 may be analyzed to determine which entities were identified by prediction model 120 and tester 130.

In a related embodiment, records in TMS 150 have a creation timestamp that indicates a date (year, month, and/or day) and, optionally, a time of day on which the record was created. Both manually and automatically-created records may have a creation timestamp. The creation timestamp may be automatically generated and stored in associated with the corresponding record when TMS 150 creates the record (whether initiated by user input or by input generated by tester 130 or de-duplicator 140).

In an embodiment, status data in TMS 150 is analyzed to determine whether an entity is associated with a certain status. Each record in TMS 150 may include a field that indicates a status. An initial status value may be NULL or some value indicating that a final decision has not yet been made. An example status that indicates that some activity with respect to the entity has been performed but that a final decision has not yet been made is "opportunity." Example statuses indicating a final decision include "no opportunity", "closed won", and "closed lost."

Initial status data for a particular entity may be established automatically when a record is created for the particular entity in TMS 150. However, a user (e.g., sales professional) updates the status data "manually," i.e., based on user input, when certain conditions are satisfied, such as a telephone conference with a representative of the particular entity, the representative signing a contract on behalf of the particular entity, or the representative refusing to enter a business relationship with the user. An entity's status may change multiple times while a record for the entity is stored in TMS 150.

In a related embodiment, each status change is associated with a timestamp that indicates a date and, optionally, a time of when the status change was made. Thus, a time between when a record was created and when a final status is set may be determined by examining the creation timestamp and a final status timestamp and calculating a difference.

By using the "creation indicator" value and the status data in each record, TMS 150 may be analyzed to determine how well prediction model 120 and tester 130 perform in identifying potentially relevant entities. For example, if a relatively high percentage of automatically-created records have a closed won status, then prediction model 120 and tester 130 are performing well. On the other hand, if a relatively high percentage of automatically-created records have a no opportunity status, then prediction model 120 and tester 130 are performing poorly and may need to be retrained.

Drip to Close Analysis

Automatically creating a record for an entity in TMS 150 based on data from entity database 110 satisfying certain criteria (e.g., having a model score above a threshold) is an example of "drip." Setting a status of an entity that has a record in TMS 150 to one of multiple possible final statuses is an example of "close." The time from an entity's drip to close is referred to as a "cycle." Thus, a record may be associated with multiple timestamps: one for record creation (indicating a drip) and one for each change in status, including one indicating a close. A difference between the time indicating a close and the time indicating a drip is referred to as the "cycle length."

In an embodiment, a cycle length is determined for each of multiple records in TMS 150. A distribution may be generated that indicates for each time bucket, a number of records whose cycle length falls within that time bucket. Analysis of the distribution may reveal that the vast majority of cycle lengths are less than a particular length (e.g., five months). The particular length may be used by labeler 160 in determining which entities to consider for training instances. For example, if an entity is associated with a cycle length that is less than the particular length, then a training instance is generated based on the entity. On the other hand, if an entity is associated with a cycle length that is greater than the particular length, then a training instance is not generated based on the entity. As another example, if the time since a drip of an entity is greater than the particular length and the entity is not yet associated with a final status, then it may be presumed that this is a negative sample and, accordingly, labeler 160 generates a negative training instance based on the entity.

In some scenarios, entity attributes that are correlated with cycle length are identified. For example, a particular region may be highly correlated with longer cycle length. As another example, a particular industry may be highly correlated with longer cycle length. As another example, company segment may be highly correlated with longer cycle length. In an embodiment, an entity's attributes may be used to determine a threshold cycle length, which is used to determine whether a training instance (whether positive or negative) should be created based on that entity. For example, a particular entity may have a cycle length that is greater than a first threshold cycle length that is associated with one set of entity attributes; but because the particular entity has another set of entity attributes that is associated with a second threshold cycle length that is longer than the first threshold cycle length and the cycle length of the particular entity is less than the second threshold cycle length, labeler 160 generates a training instance based on feature values of the particular entity.

Label Generation

In identifying records that are associated with a final status, labeler 160 generates (1) positive training instances (i.e., training instances with positive labels) for records with "positive" statuses (e.g., closed won) and (2) negative training instances (i.e., training instances with negative labels) for records with "negative" statuses (closed lost or closed disengaged). Another type of negative status is a "no opportunity," which is established if a user (e.g., sales representative) does not believe that the corresponding entity is a realistic opportunity and, therefore, marks the record with this negative status.

Thus, in one embodiment, a label of '1' indicates closed won while a label of '0' indicates not closed won. In another embodiment where more than two label values are used, a label of '1' indicate closed won, a label of '0' indicates closed lost, and a label of '-1' indicates no opportunity. Therefore, multiple tiers are tracked and entities that are associated with prediction model scores over 0.5 may be prioritized over entities that are associated with prediction model scores between 0 and 0.5.

In an embodiment, a record in TMS 150 includes a sub-status field that indicates how far an entity that is associated with an opportunity status is to becoming a closed won opportunity. Some of the sub-statuses may be associated with percentages or likelihoods of the entity becoming closed won. Because the sub-statuses are ordered, the later sub-statuses are associated with higher likelihoods relative to the earlier sub-statuses. An example sub-status is "delivery commitment" which is associated with a 99% probability of the corresponding entity becoming closed won. However, if the entity is instead eventually associated with a closed lost status, then it may be helpful to create a positive training instance for this entity rather than a negative training instance. Thus, in an embodiment, instead of simply relying on a negative final status to generate a negative training instance, labeler 160 also checks the highest sub-status (or highest probability of becoming closed won and compare against a pre-defined probability threshold, such as 75%) to determine whether to generate a negative training instance or a positive training instance.

Feature Extraction

As noted above, entity database 110 includes important information about multiple entities. Such information may be copied to TMS 150 when a drip occurs. Alternatively, the information remains in entity database 110. However, a record in TMS 150 may be tied to a record in entity database 110 using a unique identifier or multiple attribute values. For example, each record in entity database 110 is associated with a unique entity identifier or record identified. When a drip occurs for a particular entity, the corresponding unique identifier is stored in the record in TMS 150. Therefore, if a training instance is generated based on the particular entity, the unique identifier may be used to lookup data about the particular entity in entity database 110 and, optionally, in other data sources, such as a user profile database that contains user profiles, some of which may be include an entity identifier that uniquely identifies an entity in entity database 110 and that is associated with a current employer designation in the user profiles. For example, a user might specify an employer name in his/her profile, and a service that maintains the profile automatically associates the profile with the appropriate entity identifier based on, for example, the employer name and/or user input that confirms an identity of the entity.

Examples of features that are used to train (and retrain) prediction model 120 include entity data and sub-entity data. Example entity data includes a number of employees/volunteers of the entity, country in which the entity is headquartered, geographic region in which the entity is headquartered (e.g., North America, Asian and Pacific, Europe, Africa, South America), industry (or industries if the entity is involved in multiple industries), whether the organization that owns or maintains TMS 150 is a mature organization in the geographic region of the entity (where "mature" indicates how much the organization has penetrated the region, which may reflect a difference between actual sales numbers and potential sales numbers or whether the organization's product/service is the top one in the product/service space), entity description (e.g., that is provided on a web page hosted by a social network service) that may be provided by the entity or a third party, product/service revenue penetration in the same country as the entity (e.g., sum of realized revenue in the country/sum of projected revenue in the country), product/service revenue penetration in the same industry as the entity (e.g., sum of realized revenue in the industry/sum of projected revenue in the industry), the entity's market growth, the entity's stock growth, and the entity's hiring growth.

Example sub-entity data include a number of employees who are classified as recruiters, a number of employees are who are classified as marketers, a number of employees are who are classified as sales professionals, a number of employees are who are classified as talent professionals (which is a broader category of recruiter, hiring manager, and hiring professional), a number (and/or ratio) of entity employees who are associated with (e.g., registered members of) the organization that owns/maintains TMS 150 (an example of which organization is one that providers a social network service, such as LinkedIn), a number of users that "follow" the entity in a social network, a number of new hires in the last year, a number of new hires with a certain job title or function (e.g., recruiter, talent professional, marketer, sales professional) in the last year, and a number of new hires with a particular degree (e.g., PhD, Masters, or Bachelor), a number of employees with the particular degree.

As noted above, sub-entity data may be retrieved from a different source than the source from where entity data is retrieved. For example, entity data originates from entity database 110 while sub-entity data originates from a sub-entity database (not depicted). For example, sub-entity data may come from analyzing user profiles and aggregating data therefrom. For example, the job title of an employee is specified by the employee in his/her own user profile that is maintained by a social network provider (such as LinkedIn). Thus, in order to determine a number of employees, of a particular organization, that have a particular job title, user profiles are analyzed to identify ones that list the particular organization as an employer and list the particular job title. Other user attributes are listed in user profiles, such as job function, academic degree, and start date of each job listed in the profile.

Model Building

Model building comprises two main stages: feature engineering and training. One example of feature engineering is aggregating user-level (e.g., profile) information (which may be stored separately from entity-level information) to generate sub-entity data that is used for training. Another example of feature engineering is changing free text (e.g., a company description) into model-ready features, such as computing a tf-idf for a number of keywords identified in the free text.

Training involves building prediction model 120, which is used to score entities (or accounts) indicated in entity database 110 for "dripping" to TMS 150. One or more machine learning techniques may be leveraged to build prediction model 120. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with entities and sub-entities. The statistical model is trained based on multiple attributes described herein. In machine learning parlance, such attributes are referred to as "features." To generate and train a statistical prediction model, a set of features is specified and a set of training data is identified.

Embodiments are not limited to any particular machine learning technique for generating a prediction model. Example machine learning techniques include linear regression, logistic regression, random forests, naive Bayes, xgboost, and Support Vector Machines (SVMs). Advantages that machine-learned prediction models have over rule-based prediction models include the ability of machine-learned prediction models to output a probability (as opposed to a number that might not be translatable to a probability), the ability of machine-learned prediction models to capture non-linear correlations between features, and the reduction in bias in determining weights for different features.

Multi-Label Classification

The organization that maintains/owns TMS 150 may have multiple business (or enterprise) units. For example, the organization may produce different products or services to different customers and that are relevant to different industries.

In an embodiment, different enterprise units are associated with different sets of features. For example, a product for recruiters may be associated with features regarding the recruiters, talent professionals, and new hires, while a marketing product might not be associated with such features, but instead be associated with features related to marketers and employees with certain degrees (e.g., Engineering, Accounting English), while a learning product might be associated with features related to job function and employees with certain degree titles (e.g., PhD, Masters, Bachelors), while a sales product might be associated with features related to industry and number of employees that have a sales-related job title or job function.

Some features may be common to multiple enterprise units, such as industry, country, geographic region, and number of employees.

In an embodiment, multi-label classification is implemented. Each label is associated with a different enterprise unit or a different product/service. The features of the corresponding multi-label prediction model would be the same across all enterprise units.

When generating training data for training prediction model 120, labeler 140 determines multiple labels for the same entity, one label for each enterprise unit. In many cases, at most one label in a set of labels for an entity will be different than the others. For example, a set of labels for an entity may include a single '1' indicating a successful close for a particular enterprise unit and a '0' indicating an unsuccessful close for each other enterprise unit. In some cases, however, different sales professionals from different teams within the organization may target the same entities for different products/services. Thus, a training instance for an entity may include multiple positive labels. A training instance not only includes multiple labels but also a matrix of feature values. For example, each row of the matrix corresponds to a different label of the multiple labels and includes feature values corresponding to that different label.

Model Evaluation

In an embodiment, a portion of the training data is set aside to validate prediction model 120 that was trained based on another portion of the training data. Validation involves determining the accuracy the trained prediction model 120. Two types of accuracy that may be measured include recall and precision. High precision means that prediction model 120 returned substantially more relevant results than irrelevant ones, while high recall means that prediction model 120 returned most of the relevant results. Low precision means that prediction model 120 returned a significant number of false positives while low recall means that prediction model 120 returned a significant number of false negatives. A user or administrator may specify a minimum recall and/or precision before allowing the prediction model to be used in production.

In an embodiment, a F1 score is calculated and used to measure accuracy of prediction model 120. The F1 score conveys the balance between the precision and the recall and is defined as $2*((precision*recall)/(precision+recall))$.

In an embodiment, one or more other types of effectiveness of prediction model 120 is calculated based on how prediction model 120 performs on actual accounts. Example metrics that reflect those other types of effectives include:

a. Ratio of dripped accounts that have been created opportunities b. Ratio of dripped accounts that have been closed c. Ratio of dripped accounts that have been closed won d. Time lapse from account drip to close won (e.g., a distribution)

e. Close won deal size

The dripped accounts that are considered when calculating these metrics may be limited to accounts that were dripped to TMS 150 prior to a certain date in the past, such as four months ago.

In a related embodiment, one or more of these metrics are calculated for multiple values of each of one or more dimensions, such as a geographic region, industry, organization size (e.g., number of employees), etc. For example, a first ratio of dripped accounts that have been created opportunities is calculated for organizations headquartered in the Northeast while a second ratio of dripped accounts that have been created opportunities is calculated for organizations headquartered in the Southwest. As another example, a first ratio of dripped accounts that have been closed won is calculated for the medical insurance industry while a second ratio of dripped accounts that have been closed won is calculated for the finance industry.

Model Maintenance

In an embodiment, one or more trigger criteria are defined for prediction model 120 that trigger an alarm or notification to be generated or sent to assist a user or administrator in maintaining prediction model 120. An alarm or notification may cause prediction model 120 to be manually analyzed or automatically retrained. In a related embodiment, a model condition dashboard is created to monitor accuracy of prediction model 120 in terms of recall and/or precision. Recall and precision may be calculated for training instances (representing actual accounts) that are automatically generated after prediction model 120 is deployed.

In a related embodiment, success metrics other than precision and recall are generated and tracked, such as:
 a. Ratio of dripped accounts that have been created opportunities
 b. Ratio of dripped accounts that have been closed
 c. Ratio of dripped accounts that have been closed disengagement
 d. Time lapse from account drip to close won
 e. Close won deal size Each of one or more of the metrics may be associated with a pre-defined threshold value. If a generated value that is based on performance of prediction model 120 is less than a corresponding threshold value, then an alarm or notification is generated, notifying an administrator that performance of prediction model 120 needs to be closely monitored manually. Additionally or alternatively, if one or more of these threshold values is not met, then an automatic retraining of prediction model 120 is triggered.

Example Process

Figure 2:
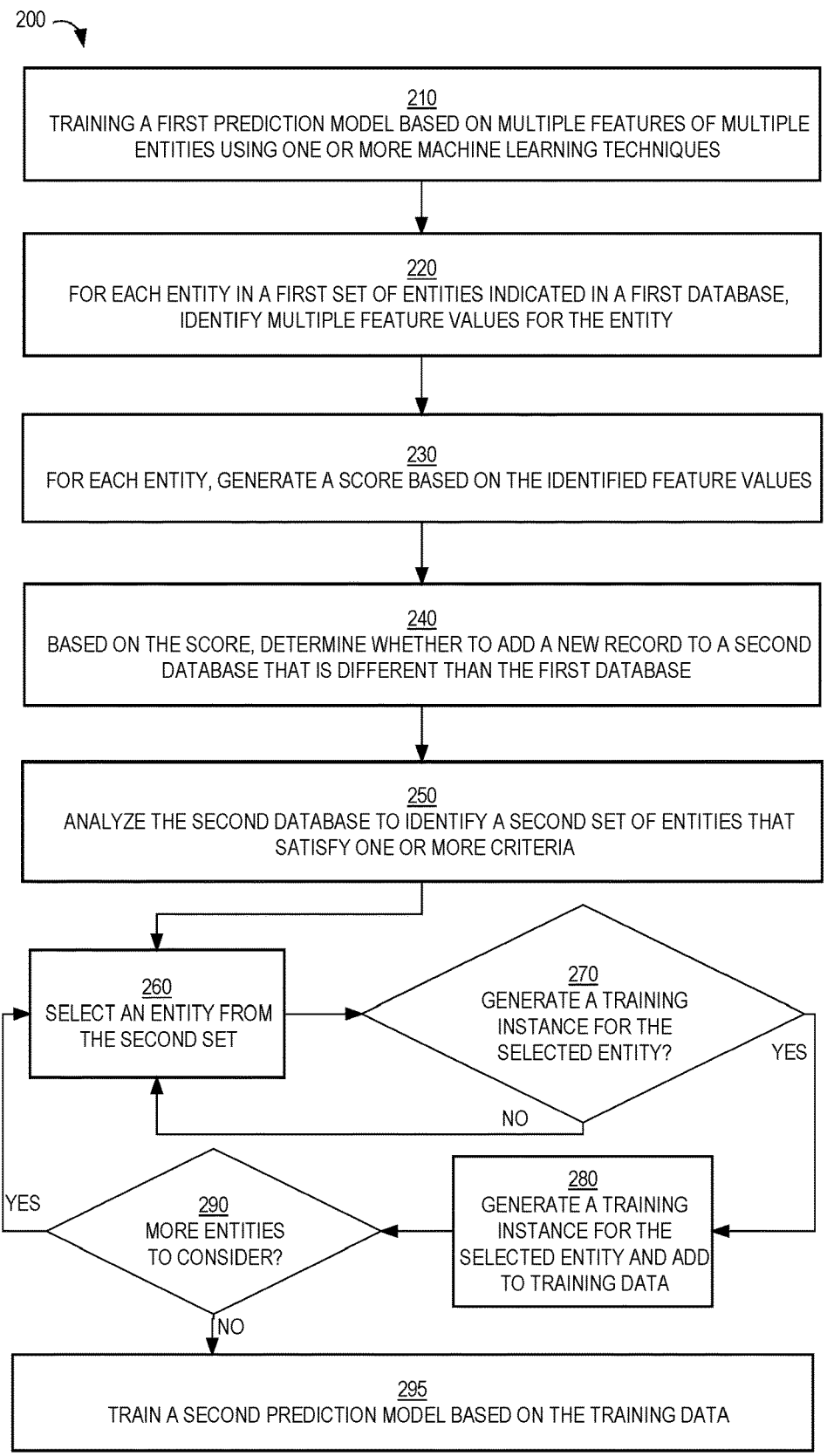
FIG. 2 is a flow diagram that depicts a process for using machine-learning techniques to process entity and sub-entity data, in an embodiment.

FIG. 2 is a flow diagram that depicts a process 200 for using machine-learning techniques to process entity and sub-entity data, in an embodiment. Process 200 may be implemented by ML system 100.

At block 210, a first prediction model that is based on multiple features of multiple entities is trained using one or more first machine learning techniques. The first prediction model comprises numerous weights or coefficients that are machine-learned. The first prediction model may be a binary classification model or a multiclass classification model.

At block 220, for each entity of a first set of entities indicated in a first database, multiple feature values for said each entity are identified. The feature values correspond to the multiple features, where a first subset of the feature values is based on entity data stored in the first database and a second subset of the feature values is based on sub-entity data regarding individuals associated with said each entity. An example of the first database is entity database 110. Block 220 may involve, for one or more feature values, transforming one or more entity data items and/or aggregating sub-entity data items to generate the feature values.

At block 230, the first prediction model generates a score based on the feature values. The feature values are input to the first prediction model.

At block 240, based on the score, it is determined whether a new record for the entity should be added to a second database that is different than the first database. An example of the second database is TMS 150.

At block 250, the second database is analyzed to identify a second set of entities, each of which satisfies one or more criteria. Block 250 may involve identifying records, in the second database, that are associated with a particular status or state and that were created as a result of using the first prediction model.

At block 260, one of the entities in the second set is selected.

At block 270, a determination is made whether to generate a training instance for the selected entity. For example, if a record corresponding to the entity was not created as a result of the first prediction model, then the record is ignored. As another example, if the record is not associated with a final status, then the record is ignored. If the record is associated with a final status and was created as a result of the first prediction model, then a training instance is created for the entity.

If the determination in block 270 is affirmative, then, at block 280, a training instance is generated for the entity and added to a set of training data. Block 280 may involve retrieving entity data from TMS 150 to determine feature values of the entity. Additionally or alternatively, block 280 may involve retrieving entity data from entity database 110 (and, optionally, data from a user profile database to generate sub-entity data) to determine feature values of the entity. The label for the training instance depends on a status or state that is indicated in the record and associated with the entity.

If the determination in block 270 is negative, then no training instance is generated and process 200 proceeds to block 290. At block 290, it is determined whether there are any more entities to consider. For example, if each entity in the second set of entities has been considered during the current iteration of process 200, then process 200 proceeds to block 295.

At bock 295, based on the set of training data, a second prediction model is trained using one or more second machine learning techniques. The second prediction model replaces the first prediction model. The second machine learning techniques may be the same as or different than the first machine learning techniques.

Third-Party Interface

In an embodiment, ML system 100 is used to identify entities for multiple third-party entities or organizations. For example, third-party organization A wishes to expand the number of high-quality accounts to pursue. Organization A interacts with a computer (e.g., web) interface to provide data about organization A and data about accounts that organization A has been able to close successfully and, optionally, unsuccessfully. For example, organization A sends entity data from a CRM database maintained by organization A to ML system 100.

ML system 100 generates a prediction model for organization A based on the data provided by organization A, scans entity database 110 for entities whose scores generated by the prediction model cause records for the entities to be created and added to a transaction management system (e.g., CRM database), where the records are only accessible to (or are private to) representatives of organization A. ML system 100 analyzes the records over time to determine the accuracy and/or effectiveness of the prediction model. Additionally, ML system 100 may "update" the prediction model by generating training instances based on a subset of the records and training a new prediction based on the training instances. ML system 100 repeats the above process for each of multiple other organizations.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
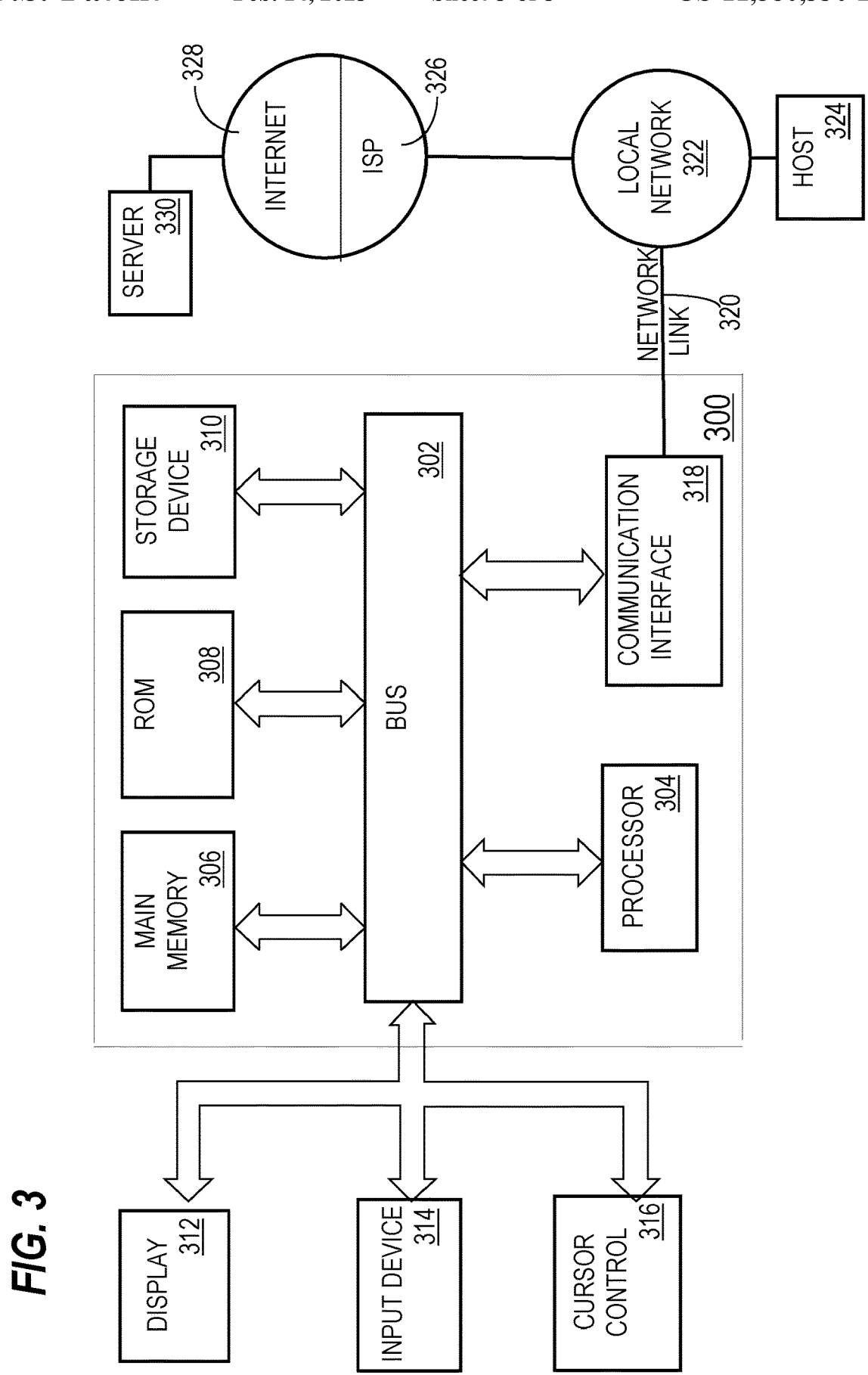
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
using one or more first machine learning techniques to generate a first prediction model that is based on a plurality of features of multiple entities;
for a first entity of a first plurality of entities indicated in a first database:
(i) identifying a plurality of feature values for the first entity;
wherein the plurality of feature values include a first subset of feature values that is based on entity data stored in the first database, and include a second subset of feature values that is based on sub-entity data regarding individuals associated with the first entity;
(ii) inputting the plurality of feature values into the first prediction model to generate a score;
(iii) based on the score and a second database not containing a record for the first entity, adding, to the second database, the record for the first entity;
the record in the second database stores creation data and status data;
the creation data indicates whether the record is machine-generated or user-generated;
the status data indicates a status of the record that can be updated based on user input;
analyzing the second database to identify a second plurality of entities;
for a second entity of the second plurality of entities that corresponds to the first entity indicated in the first database:
(i) tracking changes in the status data;
(ii) making a determination whether to generate a training instance based on the creation data and the tracking of changes in the status data;
(iii) in response to making the determination, generating a particular training instance;
adding the particular training instance to training data; and
based on the training data including the particular training instance, using one or more second machine learning techniques to retrain the first prediction model;
wherein the method is performed by one or more computing devices.

2. The method of claim 1, wherein determining whether to add the record to the second database comprises determining whether a record for the first entity indicated in the first database already exists in the second database.

3. The method of claim 2, wherein determining whether a record for the first entity indicated in the first database already exists in the second database comprises:
identifying a first plurality of attributes of the first entity indicated in the first database;
identifying a second plurality of attributes of a second entity indicated in the second database;
wherein determining whether a record for the first entity indicated in the first database already exists in the second database is based on the first plurality of attributes and the second plurality of attributes;
wherein the first plurality of attributes and the second plurality of attributes include two or more of entity name, geographic location, URL, and email address.

4. The method of claim 1, wherein making a determination whether to generate a training instance for the first entity indicated in the first database comprises:
determining a creation date of a particular record, in the second database, of the first entity indicated in the first database;
determining a status of the first entity indicated in the first database based on the particular record;
determining a status date, indicated in the particular record, of the status of the first entity;
wherein the determination is based on a difference between the status date and the creation date.

5. The method of claim 1, wherein generating the particular training instance for the first entity indicated in the first database comprises:
identifying, in the second database, a particular record for the first entity indicated in the first database;
determining, based on the particular record, a status of the first entity indicated in the first database, wherein the status of the first entity is one of a plurality of possible statuses;
generating a label based on the status of the first entity;
including the label in the particular training instance.

6. The method of claim 1, wherein generating the particular training instance for the first entity indicated in the first database comprises:
identifying, in the second database, a particular record for the first entity indicated in the first database;
identifying, in the particular record, an identifier;
based on the identifier, identifying, in the first database, a first record that corresponds to the first entity;
based on the first record, identifying a first plurality of feature values of the first entity;
including the first plurality of feature values in the particular training instance.

7. The method of claim 1, wherein the first subset of feature values of the first entity indicated in the first database includes two or more of:
a number of employees of the first entity indicated in the first database, industry of the first entity, a country in which the first entity is headquartered, and an entity description that is provided by the first entity.

8. The method of claim 1, wherein the second subset of feature values of the first entity indicated in the first database includes two or more of:
a number of employees of the first entity that are classified in a particular type of role, a number of new hires in a period of time, a number of employees with a particular degree, a number of new hires with a particular job title or job function;
identifying the second subset of feature values comprises:
identifying, in a user profile database, a plurality of user profiles that list the first entity indicated in the first database, and
computing the two or more of: the number of employees of the first entity that are classified in a particular type of role, the number of new hires in a period of time, the number of employees with a particular degree, the number of new hires with a particular job title or job function based on the plurality of user profiles.

9. The method of claim 1, wherein generating the particular training instance comprises:

generating a plurality of labels for the particular training instance, wherein generating the plurality of labels comprises determining, for each enterprise unit of a plurality of enterprise units, a label to include in the plurality of labels, wherein each label of the plurality of labels corresponds to a different unit of the plurality of enterprise units.

10. The method of claim 1, further comprising:
evaluating the first prediction model, wherein evaluating comprises:
identifying a third plurality of entities for which a record has been added to the second database;
determining one or more of a percentage of the third plurality of entities that have been created opportunities, a percentage of the third plurality of entities that have been closed, a percentage of the third plurality of entities that have been closed won, a distribution of time lapses, each indicating a difference between when the record for each entity, of the third plurality of entities, that has been added to the second database and when the record indicated a particular final status.

11. The method of claim 1, further comprising:
receiving first entity data about the first plurality of entities from a first organization;
receiving second entity data about a third plurality of entities from a second organization that is different than the first organization;
based on at least a portion of the second entity data, generating a third prediction model that is different than the first prediction model;
using the third prediction model to generate scores for entities reflected in the second entity data.

12. One or more storage media storing instructions which, when executed by one or more processors, cause:
using one or more first machine learning techniques to generate a first prediction model that is based on a plurality of features of multiple entities;
for a first entity of a first plurality of entities indicated in a first database:
(i) identifying a plurality of feature values for the first entity;
wherein the plurality of feature values include a first subset of feature values that is based on entity data stored in the first database, and include a second subset of feature values that is based on sub-entity data regarding individuals associated with the first entity,
(ii) inputting the plurality of feature values into the first prediction model to generate a score;
(iii) based on the score and a second database not containing a record for the first entity, adding, to the second database, the record for the first entity;
the record in the second database stores creation data and status data;
the creation data indicates whether the record is machine-generated or user-generated;
the status data indicates a status of the record that can be updated based on user input;
analyzing the second database to identify a second plurality of entities;
for a second entity of the second plurality of entities that corresponds to the first entity indicated in the first database:
(i) tracking changes in the status data;
(ii) making a determination whether to generate a training instance based on the creation data and the tracking of changes in the status data;
(iii) in response to making the determination, generating a particular training instance;
adding the particular training instance to training data; and
based on the training data including the particular training instance, using one or more second machine learning techniques to retrain the first prediction model.

13. The one or more storage media of claim 12, wherein determining whether to add the record to the second database comprises determining whether a record for the first entity already exists in the second database.

14. The one or more storage media of claim 13, wherein determining whether a record for the first entity already exists in the second database comprises:
identifying a first plurality of attributes of the first entity indicated in the first database;
identifying a second plurality of attributes of a second entity indicated in the second database;
wherein determining whether a record for the first entity already exists in the second database is based on the first plurality of attributes and the second plurality of attributes;
wherein the first plurality of attributes and the second plurality of attributes include two or more of entity name, geographic location, URL, and email address.

15. The one or more storage media of claim 12, wherein making a determination whether to generate a training instance comprises:
determining a creation date of a particular record, in the second database, of the second entity;
determining a status of the second entity based on the particular record;
determining a status date, indicated in the particular record, of the status of the second entity;
wherein the determination is based on a difference between the status date and the creation date.

16. The one or more storage media of claim 12, wherein generating the particular training instance comprises:
identifying, in the second database, a particular record for the second entity;
determining, based on the particular record, a status of the second entity, wherein the status of the second entity is one of a plurality of possible statuses;
generating a label based on the status of the second entity;
including the label in the particular training instance.

17. The one or more storage media of claim 12, wherein the first subset of feature values of the first entity includes two or more of:
a number of employees of the first entity, industry of the first entity, a country in which the first entity is headquartered, or an entity description that is provided by the first entity.

18. The one or more storage media of claim 12, wherein the second subset of feature values of the first entity includes two or more of:
a number of employees of the first entity that are classified in a particular type of role, a number of new hires in a period of time, a number of employees with a particular degree, a number of new hires with a particular job title or job function; and
identifying the second subset of feature values comprises:
identifying, in a user profile database, a plurality of user profiles that list the first entity, and computing the two or more of: the number of employees of the first entity that are classified in a particular type of role, the number of new hires in a period of time, the number of employees with a particular degree, the number of new hires with a particular job title or job function based on the plurality of user profiles.

19. The one or more storage media of claim 12, wherein generating the particular training instance comprises:
generating a plurality of labels for the particular training instance, wherein generating the plurality of labels comprises determining, for each enterprise unit of a plurality of enterprise units, a label to include in the plurality of labels, wherein each label of the plurality of labels corresponds to a different unit of the plurality of enterprise units.

20. The one or more storage media of claim 12, wherein the instructions, when executed by the one or more processors, further cause:
evaluating the first prediction model, wherein evaluating comprises:
identifying a third plurality of entities for which a record has been added to the second database;
determining one or more of a percentage of the third plurality of entities that have been created opportunities, a percentage of the third plurality of entities that have been closed, a percentage of the third plurality of entities that have been closed won, a distribution of time lapses, each indicating a difference between when the record for each entity, of the third plurality of entities, that has been added to the second database and when the record indicated a particular final status.

\* \* \* \* \*